United States Patent

[11] 3,576,480

[72] Inventor Paul M. Barton
San Jose, Calif.
[21] Appl. No. 9,664
[22] Filed Feb. 9, 1970
[45] Patented Apr. 27, 1971
[73] Assignee International Telephone and Telegraph Corporation
New York, N.Y.

[54] TEMPERATURE-COMPENSATING APPARATUS FOR VARIABLE ELECTRICAL PARAMETER DEVICE
10 Claims, 1 Drawing Fig.
[52] U.S. Cl....................................................... 317/245,
317/251
[51] Int. Cl....................................................... H01g 5/14,
H01g 5/34
[50] Field of Search.......................................... 317/245,
249 (R), 249 (T), 251; 338/8; 336/(Inquired)

[56] References Cited
UNITED STATES PATENTS
2,740,926 4/1956 Jennings et al. ............... 317/245
2,740,927 4/1956 Jennings et al. ............... 317/245
2,883,593 4/1959 Jennings........................ 317/251X
3,257,590 6/1966 Hansen.......................... 317/245
3,270,259 8/1966 Oeschger...................... 317/245X

*Primary Examiner*—Laramie E. Askin
*Attorneys*—C. Cornell Remsen, Jr., Walter J. Baum, Paul W. Hemminger, Charles L. Johnson, Jr. and Thomas E. Kristofferson ABSTRACT: A temperature compensating arrangement in a variable electrical parameter device such as a variable vacuum capacitor which is controlled by a lead screw engaged to an axially translating shaft member. The engagement of the lead screw into the shaft member is through a sleeve insert member. The sleeve insert is threaded to connect to threads inside the control end of the shaft and the lead screw engages interior threads over a relatively small axial length substantially at the innermost end of the insert. Vacuum capacitors are typical of such variable electrical parameter devices. As illustrated, thermal expansion of the shaft is counteracted by expansion of the insert member. The insert member is normally constructed of material having a higher coefficient of thermal expansion than the shaft and the other structural members tending to increase the capacitor plate mesh with their expansion.

Patented April 27, 1971 3,576,480
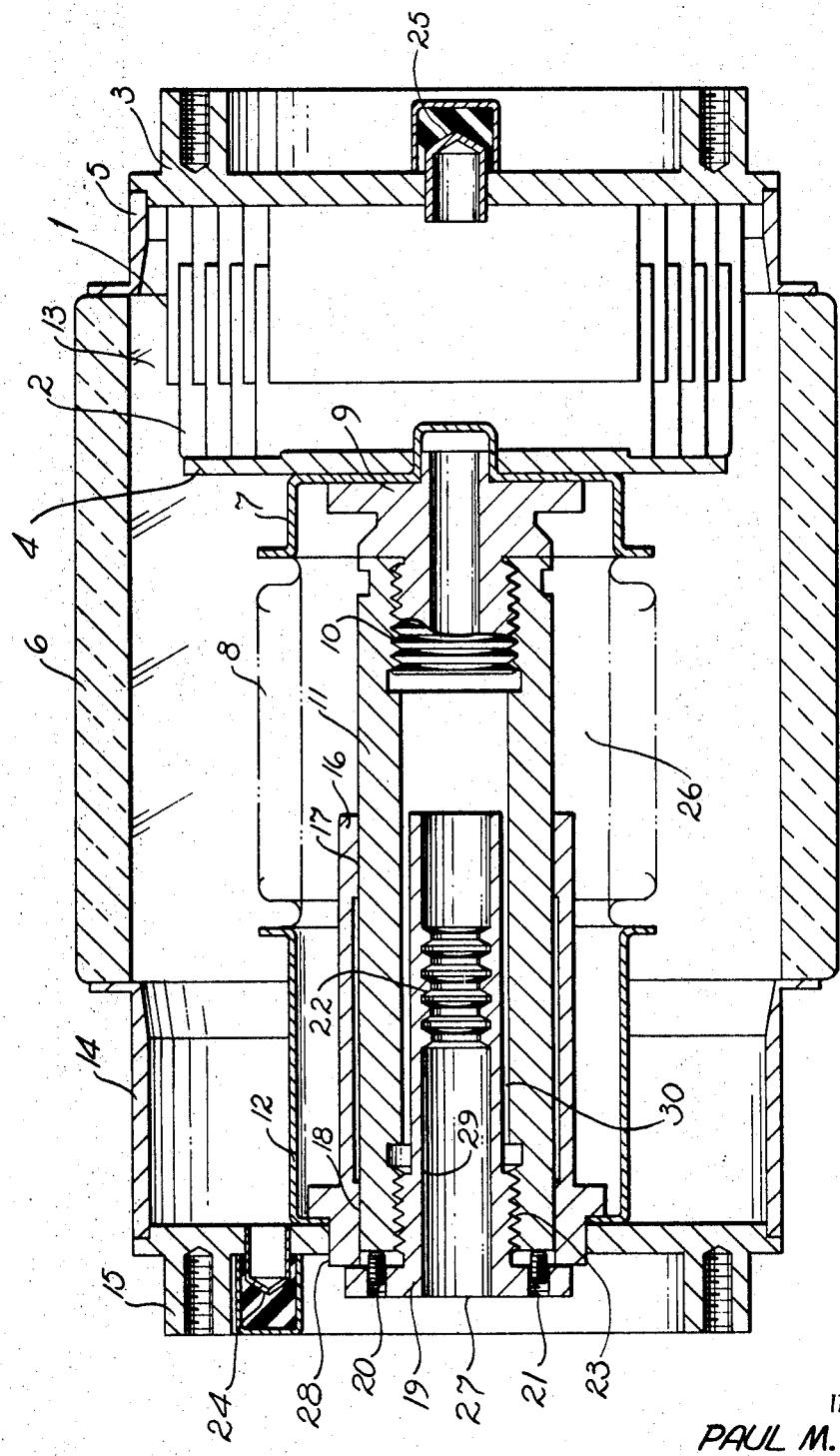
INVENTOR.
PAUL M. BARTON.
BY William T. O'Neil
AGENT.

TEMPERATURE-COMPENSATING APPARATUS FOR VARIABLE ELECTRICAL PARAMETER DEVICE

BACKGROUND OF THE INVENTION

1. Field of the Invention

The invention relates generally to devices for compensation of thermal expansion, and more particularly, to mechanical translation controlling structure providing compensatory thermal expansion of predeterminable magnitude and sense.

2. Description of the Prior Art

In the realm of adjustable electrical circuit components, such as variable capacitors, inductors, rheostats and etc., a mechanical force and motion brings about the adjustment of the value of capacitance, inductance, or resistance of the particular component. All such devices used in connection with high power applications present peculiar problems arising from the heat internally generated in the component, due to electrical losses therein. The sources of these losses are well-known; they include IR drops, eddy currents and hysteresis, which are typical well-known power loss producing phenomena.

In vacuum variable capacitors, a common prior art approach to the problem of minimizing capacitance drift due to heating, has been the use of materials of low thermal expansion coefficient for parts, the expansion of which would significantly affect the value of capacitance. Obviously, correction is only partial and then only in one sense. Compensatory expansion is not envisioned in such a device, and therefore the effect is ameliorated, but not truly compensated.

Depending on the many complex circuit and system factors relating to the current flowing and therefore the heating effect in devices of the type, it may be desirable to construct the device with a predetermined residual positive temperature coefficient, a substantially zero coefficient, or an overall negative coefficient. For the same reasons the prior art approaches to the problem do not provide the flexibility of design consistent with that type of predetermination.

The present invention is directed toward the provision of unique apparatus for solving the aforementioned prior art problems in a manner to be described as this specification proceeds.

The prior art in respect to lead screw operated vacuum variable capacitors is typically represented in U.S. Pat. Nos. 2,740,926, 2,740,927 and also in 3,257,590. Materials, assembly methods and other details of the practice of this art are also well-known in the patent literature and other technical publications.

SUMMARY OF THE INVENTION

In consideration of the prior art disadvantages, the general objective of the present invention may be said to be the provision of compensating apparatus between the point of lead screw engagement and the external end of the axially adjustable shaft member.

The invention was found to be particularly applicable to vacuum variable capacitors. Such devices are usually contained in elongated vessels or housings of overall circular cross section. The fixed capacitor plates are normally at one end of the interior of the housing and the variable plates are connected to an axially movable shaft member (internal shaft end) driven by engagement with a lead screw at the other (external) end. Reference patents hereinabove recited provide an elementary knowledge of this area of the pertinent art.

In discussing the overall coefficient of expansion and the net contribution of each part of a typical structure, the convention adopted for this discussion will be as follows: any expansion resulting in increased meshing of the capacitor plates will be considered positive and that causing decreased capacitor plate meshing will be called negative.

In accordance with the foregoing, thermal expansion of the shaft member and the plates themselves is positive, whereas expansion of the housing has a negative effect per se. Depending upon the materials used in these elements of the structure and the uniformity of heating which takes place, the overall temperature coefficient may be positive or negative and the required correction is therefore the converse and may itself then be of either sense.

In the present invention the shaft is a hollow tubular member. The lead screw drive thereto does not engage the shaft member directly, but rather engages threads over a limited length increment inside a concentric sleeve or insert member slideably fit inside the hollow shaft member. These lead screw engaging threads are normally at or near the internal end of this insert, and the external end is connected to the shaft member substantially at its external or control end.

Thus, the thermal expansion of the insert member tends to operate against the lead screw on its internal end to force the shaft member external end outward. The thermal coefficient of expansion of the insert member is the primary and most effective predeterminable compensating variable. As a matter of design, however, the screw thread engagement of the shaft and insert members at their external ends provides vernier adjustment to vary the effective length of the insert member and therefore its net expansion factor per degree of temperature rise (or contraction per degree of temperature decline).

The detailed description to follow describes a particular embodiment of the invention for a more complete understanding of the inventive concepts.

BRIEF DESCRIPTION OF THE DRAWING

The FIGURE is an axial sectional view of a vacuum variable capacitor incorporating the temperature correcting apparatus of the present invention.

DESCRIPTION OF THE PREFERRED EMBODIMENT

Referring now to the FIGURE, the vacuum capacitor shown comprises a substantial amount of structure typical of the prior art, into which the apparatus of the present invention has been integrated. The capacitor parts which comprise the heart of the variable electrical parameter device include the fixed plates 1 and axially variable (movable) plates 2. These parts are in the general shape of interleaving sheets of coaxial cylinders or "cans." The endplate 3 provides the mounting for the fixed plates at 1 and the mounting plate 4 carries the movable plates 2.

The envelope or housing, which is vacuum-tight in its enclosure of the evacuated space 13, comprises the endplate 3, sleeve part 5, a ceramic cylindrical body member 6, the sleeve 14 and the end plate 15. While the volume at 13 extending around the capacitor cans and within the space between the ceramic body 6 and the bellows 8 and on down to the space between 12 and 14, is evacuated, the space 26 inside the bellows 8 and the sleeve 12 remains at atmospheric pressure. Suitable methods of joining the metallic members 5 and 14 to the ceramic body 6 in a vacuum-tight manner are known in this art. Similarly, methods for joining the metal bellows 8 to the parts 7 and 12 by brazing or the like, are well-known. The same may be said for the joining of part 7 to 4 and 14 to 15.

It will be seen that typical capped tabulations 24 and 25 provide for evacuation and the cleaning and flushing operations which frequently precede evacuation of the assembly.

The endplate 15 will be seen to be a rigidly attached part of the envelope or housing of the device so that the tubular bearing member 16, when firmly joined to 15 at 28, is itself relatively rigid. This tubular bearing member 16 thus supports the hollow shaft member 11 along the bearing surfaces 17 and 18 to provide reasonable lateral mechanical rigidity of the cantilevered parts which extend up to and including the axially movable plates 2.

The plug 9 which is threaded at 10 into the interior end of the shaft member 11 provides a mechanical support and heat sink function between the variable plate base 4 and the shaft 11.

An additional part, namely the correcting insert member 19, has a central bore open at the exterior shaft end at 27. This part fits slideably along the exaggerated clearance space 30 within shaft member 11, but is joined by threads 23 thereto at the said shaft exterior end. A lead screw (not illustrated), which has rotational freedom only, is inserted at 27 for operation of the device and fits slideably along the surface 29 and engages the internal threads 22 in the insert member 19. The lead screw, being presumed to be axially fixed with respect to the housing structure of the device, when turned, controls the capacitor plate engagement by axially translating the shaft member 11 and insert member 19 as a unit.

It will be seen that the axial length of the insert member 19 between the thread engagements 22 and 23 provides compensatory thermal expansion, in that its expansion with respect to the lead screw engagement at 22 is outward (to the left as viewed on the FIG.). Thus, expansion of 19 tends to exert a negative overall effect on the relation of the variable electrical parameter (capacitance) as a function of temperature.

It will be evident that expansion of parts 5, 6 and 14 would produce a similar negative effect but, expansion of the shaft 11 is a positive factor in this regard. The selection of materials among the parts 5, 6, 14, 9, 11, 1 and 2 theoretically could result in an overall net zero coefficient for a particular size and design of the device. However, more compelling factors usually dictate the choice of these materials and accordingly, an important advantage of the present invention accrues because of the freedom to make a design selection of the material for the insert member 19 (with a suitable coefficient of thermal expansion among other things) and also to preselect the effective length between thread engagements 22 and 23. It is thereby possible not only to bring about substantially complete temperature correction, but also to under or over compensate if one of these expediencies is indicated by application requirements. The insert member 19 can be preset (i.e., the thread engagement at 23 can be increased or decreased) to provide a vernier action in respect to the net effect of the expansion of 19. Set screws 20 and 21 merely lock the member 19 with respect to 11, once this adjustment has been made.

It will be apparent to the skilled reader that the internal insert thread 22 could, in fact, be emplaced in an additional plug, similar to the insert member itself, but engaged at the internal insert extremity by a thread similar to 23. In that way, additional adjustment of the effective length of the compensating insert member is provided, in addition to, or in lieu of the structure shown.

Other modifications and variations within the spirit and scope of the present invention will suggest themselves to those skilled in this art. It is not intended that the scope of the present invention should be limited by the drawing or specification, as these are intended to be illustrative and typical only.

I claim:

1. Apparatus for providing compensation for thermal expansion and contraction of structural parts producing spurious variations in a variable electrical parameter device controlled by mechanical translation in a drive assembly, said drive assembly including means for converting the rotation of a lead screw to said mechanical translation, comprising:

means including an elongated shaft member mounted with substantially only axial translational freedom, said shaft member being connected to said variable parameter device to produce variable control thereof as a function of said mechanical translation of said shaft member;

an elongated temperature correcting member connected substantially from one end thereof to said shaft member at a point a major fraction of the length of said shaft member from said connection of said shaft member to said variable parameter device, said correcting member being oriented in substantially the same direction as said shaft member;

and engaging means within said correcting member at a location between said connection to said variable parameter device and said connection between said shaft and correcting members, for engaging said lead screw to produce said translation corresponding to rotation of said lead screw, whereby the thermal expansion and contraction effective at said connection to said variable parameter device due to temperature changes of said correcting member are of opposite sense compared to those introduced by thermal expansion of said shaft member.

2. In a device adapted to vary an electrical parameter in response to an applied mechanical force, said device including a housing and at least one mechanically variable element therein, the combination comprising:

a tubular shaft member arranged to translate substantially in a single coordinate, said shaft member being engaged to control said variable element;

an elongated hollow bearing member substantially fixed with respect to said housing, said bearing member being adapted to support said shaft member along at least a portion of its outside surface;

an elongated hollow temperature compensating insert member slideably mounted within said shaft member, said insert member being connected to said shaft member at a first predetermined location a major fraction of the length of said shaft member from said engagement to control said variable element;

and control connection means making an interior connection with said insert member at a location between said first predetermined location and said tubular shaft engagement to control said variable element, to drive said connected shaft member through a predetermined length of said insert member.

3. The invention set forth in claim 2 further defined in that said insert member is constructed of material having a coefficient of thermal expansion different from that of the material from which said shaft member is constructed.

4. The invention set forth in claim 2 further defined in that said insert member is constructed of material having a coefficient of thermal expansion greater than that of the material from which said shaft member is constructed.

5. The invention set forth in claim 4 further defined in that said shaft member and said insert member are both of substantially circular cross section and said insert member is disposed coaxially and slideably within the hollow interior of said shaft member, said connection at said first predetermined location being substantially at the end of said shaft member opposite said engagement to control said variable element.

6. The invention set forth in claim 5 in which said connection at said first predetermined location is effected by thread engagement between said shaft member and said insert member, whereby said insert member may be variably positioned axially at said first predetermined location to vary the effective distance between said first predetermined location and said control connection means to correspondingly vary the net magnitude of the temperature compensation provided.

7. The invention set forth in claim 6 in which said control connection means comprises at least one internal thread within said insert member adapted to engage a lead screw inserted from the end corresponding to said first predetermined location and otherwise fitting slideably within said insert member.

8. The invention set forth in claim 7 in which said variable electrical parameter device is a variable vacuum capacitor having a movable plate set in an evacuated chamber comprising said variable element within said housing, said engagement of said shaft member to control said variable element is through a vacuum seal including an axially extendable bellows, whereby said engagement of said lead screw and said internal thread within said insert member is preloaded by external atmospheric pressure against said bellows.

9. Apparatus defined in claim 6 in which said insert member is constructed of a material having a sufficiently high coefficient of thermal expansion that said variable axial positioning of said insert can be adjusted to obtain an effective overall temperature coefficient of substantially zero for said electrical parameter device.

10. Apparatus defined in claim 6 in which said insert member is constructed of a material having a sufficiently high coefficient of thermal expansion that said variable axial positioning of said insert can be adjusted to obtain an effective overall negative temperature coefficient for said electrical parameter device.